United States Patent
Rozman et al.

(10) Patent No.: US 9,054,610 B2
(45) Date of Patent: Jun. 9, 2015

(54) GENERATOR ARCHITECTURE WITH MAIN FIELD ROTATING POWER CONVERTER

(71) Applicant: Hamilton Sundstrand Corporation, Windsor Locks, CT (US)

(72) Inventors: Gregory I. Rozman, Rockford, IL (US); Jacek F. Gieras, Glastonbury, CT (US); Steven J. Moss, Rockford, IL (US)

(73) Assignee: United Technologies Corporation, Hartford, CT (US)

( * ) Notice: Subject to any disclaimer, the term of this patent is extended or adjusted under 35 U.S.C. 154(b) by 185 days.

(21) Appl. No.: 13/833,809

(22) Filed: Mar. 15, 2013

(65) Prior Publication Data

US 2014/0266078 A1    Sep. 18, 2014

(51) Int. Cl.
*H02P 9/02* (2006.01)
*H02P 9/10* (2006.01)
*H02P 9/30* (2006.01)

(52) U.S. Cl.
CPC .. *H02P 9/02* (2013.01); *H02P 9/10* (2013.01); *H02P 9/302* (2013.01)

(58) Field of Classification Search
CPC ............. H02P 9/305; H02P 9/38; H02P 9/30; H02P 2009/002

USPC ........................................... 322/27; 310/68 D
See application file for complete search history.

(56) References Cited

U.S. PATENT DOCUMENTS

| | | | | |
|---|---|---|---|---|
| 3,768,002 | A * | 10/1973 | Drexler et al. | 322/25 |
| 4,393,345 | A * | 7/1983 | Fork et al. | 322/19 |
| 4,480,204 | A * | 10/1984 | Kuter et al. | 310/68 R |
| 4,625,160 | A * | 11/1986 | Hucker | 322/32 |
| 4,723,106 | A * | 2/1988 | Gibbs et al. | 322/26 |
| 5,029,263 | A | 7/1991 | Rozman | |
| 5,055,765 | A | 10/1991 | Rozman et al. | |
| 5,233,286 | A | 8/1993 | Rozman et al. | |
| 5,325,043 | A | 6/1994 | Parro | |
| 5,488,286 | A | 1/1996 | Rozman et al. | |
| 6,420,842 | B1 | 7/2002 | Gold | |
| 7,064,524 | B2 | 6/2006 | Yao | |
| 7,282,893 | B2 | 10/2007 | Yao | |
| 8,199,545 | B2 * | 6/2012 | Nguyen et al. | 363/165 |
| 2010/0226159 | A1 * | 9/2010 | Stern | 363/132 |
| 2010/0256782 | A1 * | 10/2010 | Dai | 700/14 |
| 2012/0217920 | A1 * | 8/2012 | Singh et al. | 318/490 |

* cited by examiner

*Primary Examiner* — Tulsidas C Patel
*Assistant Examiner* — Sean Gugger
(74) *Attorney, Agent, or Firm* — Kinney & Lange, P.A.

(57) ABSTRACT

A generator includes a stationary portion and a rotating portion. The stationary portion includes a main armature winding and the rotating portion includes a main field winding a main field rotating power converter that selectively controls current supplied to the main field winding.

16 Claims, 4 Drawing Sheets

GENERATOR ARCHITECTURE WITH MAIN FIELD ROTATING POWER CONVERTER

CROSS-REFERENCE TO RELATED APPLICATION(S)

Reference is made to application Ser. No. 13/836,255 entitled "Method of Controlling Rotating Main Field Converter", application Ser. No. 13/835,089 entitled "Variable Speed Constant Frequency System with Generator and Rotating Power Converter", application Ser. No. 13/836,428 entitled "EPGS Architecture with Multi-Channel Synchronous Generator and Common Field Regulated Exciter", application Ser. No. 13/836,007 entitled "EPGS Architecture with Multi-Channel Synchronous Generator and Common Unregulated PMG Exciter", and application Ser. No. 13/833,212 entitled "Generator Architecture with PMG Exciter and Main Field Rotating Power Converter" which are filed on even date herewith and are assigned to the same assignee as this application.

BACKGROUND

The present invention is related to generator architectures and in particular to generator architectures utilizing main field rotating power converters.

In the simplest terms, generators convert mechanical energy to electrical energy via the interaction of rotating magnetic fields and coils of wire. A multitude of generator architectures have been developed with various means of providing interaction between magnetic fields and coils of wire. For example, a permanent magnet generator (PMG) utilizes permanent magnets to generate a constant magnetic field, which is rotated via the mechanical energy supplied by a prime mover such that the rotating magnetic field interacts with the stator coils to provide an output voltage. Another type of generator supplies current through a coil to generate the desired magnetic field, which is rotated via the mechanical energy supplied by a prime mover, such that a rotating magnetic field is created that interacts with stator coils to provide an output voltage.

In the former example, the output voltage supplied by the PMG depends only on the magnitude of the mechanical energy supplied by the prime mover. In the latter example, the output voltage of the generator can be regulated by varying the current supplied to the field coil. For applications in which the output voltage must be regulated, the latter example, known as a wound field synchronous machine, is widely utilized. A PMG is sometimes utilized in conjunction with the wound field synchronous machine to source the current supplied to an exciter winding to regulate the output of the wound field synchronous machine.

For example, in aircraft applications, a typical variable frequency generator (VFG) includes a permanent magnet section, an exciter section, and a main field section. The permanent magnet portion includes permanent magnets employed on the rotating portion, which generate an alternating current voltage on the stator portion. The AC voltage provided by the permanent magnet portion is rectified and selectively applied to the exciter winding on the stationary portion of the exciter. The exciter current generates an AC voltage on the rotating portion of the exciter. A rotating rectifier rectifies the AC voltage and supplies the DC voltage to a main field winding on the rotating portion of the main field section. The DC voltage on the main field winding induces the AC generator output voltage on the generator armature winding. The magnitude of the AC generator output voltage is regulated by controlling the current supplied to the exciter coil on the stationary portion of the exciter.

One drawback of this architecture is sudden load changes may result in sudden changes in generator speed, and consequently sudden increases in generator output voltages which may be damaging to the generator and/or attached loads.

SUMMARY

A generator includes a stationary portion and a rotating portion. The stationary portion includes a main armature winding and the rotating portion includes a main field winding a main field rotating power converter that selectively controls current supplied to the main field winding.

DETAILED DESCRIPTION

Figure 1:
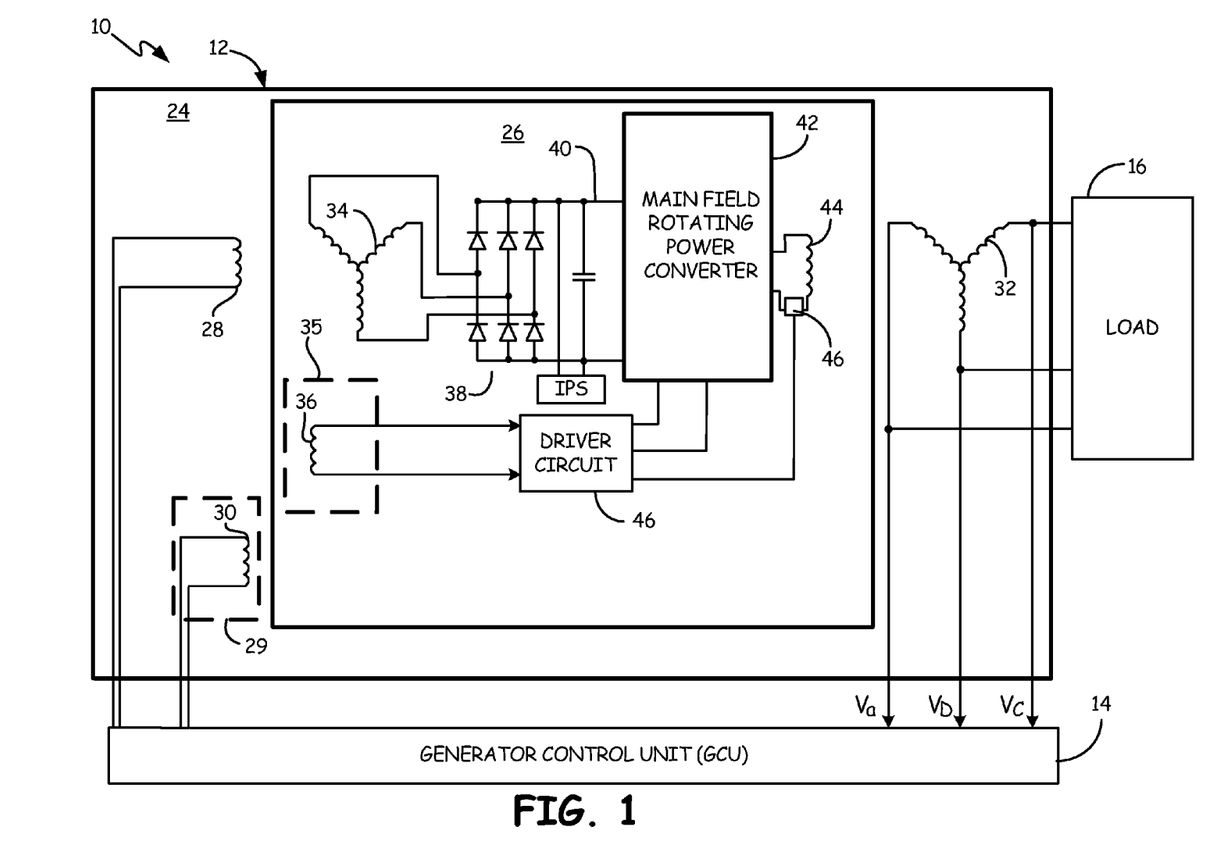
FIG. 1 is a circuit diagram of an electric power generation and distribution system according to an embodiment of the present invention.

FIG. 1 is a circuit diagram of electric power generation and distribution system 10 according to an embodiment of the present invention. System 10 includes generator 12, generator control unit (GCU) 14, and load 16. Generator 12 is divided into stationary portion 24 and rotating portion 26. Stationary portion 24 includes exciter field winding 28, stationary communication module 29 (which in this embodiment includes coil 30), and main armature windings 32. Rotating portion 26 includes exciter armature windings 34, rotating communication module 35 (which in this embodiment includes coil 36), rectifier 38, direct current (DC) link capacitor CdcR, DC link bus 40, main field rotating power converter 42, main field winding 44, and current sensor 46.

Generator control unit (GCU) 14 is responsible for regulation and protection of generator 12. Regulation refers to maintaining the output voltage of generator 12 provided by main armature winding 32 at a desired level. Protection refers, at least in part, to preventing faults such as overvoltage faults from damaging generator 12 or attached loads 16. As discussed in more detail below, the output voltage is regulated by either regulating the current supplied to exciter field winding 28 (as is normally done in wound field synchronous machines) or regulating the current supplied to main field winding 44 located on the rotating portion 26 of generator 12. Regulation of the output voltage via control the current supplied to main field winding 44 requires communication of commands/instructions/feedback across the air gap separating stationary portion 24 from rotating portion 26. Likewise, overvoltage protection is provided by communicating commands/instructions across the air gap separating stationary portion 24 from rotating portion 26. As discussed in more detail below, based on the received instructions/commands, main field rotating power converter 42 selectively applies voltage to main field winding 44.

In the embodiment shown in FIG. 1, GCU 14 is connected to monitor the output voltage provided by main armature winding 32, provide excitation (e.g., current) to exciter field winding 28, and communicate commands, instructions, and/or feedback to rotating portion 26 of generator 12 via stationary communication module 29. Excitation supplied to exciter field winding 28 induces an AC voltage in exciter armature winding 34 located on rotating portion 26. The AC voltage generated on exciter armature winding 34 is rectified by rectifier 38 and DC link capacitor CdcR to a DC voltage that is supplied to main field rotating power converter 42 via DC link bus 40. In the embodiment shown in FIG. 1, rectifier 38 is a passive rectifier comprised of a plurality of bridge-connected diodes. In other embodiments, rectifier 38 may be an active rectifier in which the diodes are replaced with a plurality of solid-state switches selectively controlled to provide a DC output to main field rotating power converter 42. Main field rotating power converter 42 selectively applies voltage from DC link 40 to main field winding 44, allowing current to build up in main field winding 44 when main field rotating power converter 42 is On and dissipating current in main field winding 44 when main field rotating power converter 42 is Off. Current through main field winding 44 induces an AC voltage in main armature winding 32 that is monitored by GCU 14 and supplied to load 16.

In one embodiment, main field rotating power converter 42 includes one or more switches that are turned On and Off to selectively control the supply of current to main field winding 44. The state of main field rotating power converter 42 is modified based on feedback/commands received from GCU 14 via stationary and rotating communication modudles 29 and 35, respectively, which are coupled to communicate across the air gap between stationary portion 24 and rotating portion 26. In the embodiment shown in FIG. 1, stationary and rotating communication modules 29 and 35, respectively, are implemented with inductively coupled coils 30 and 36, which form a rotating transformer. Control instructions generated by GCU 14 are communicated to primary winding 30 and communicated across the airgap to secondary coil 36 via magnetic induction. In the embodiment shown in FIG. 1, communications are uni-directional, from GCU 14 to rotating portion 26. However, in other embodiments the communication between GCU 14 and rotating portion 26 may be bi-directional, with instructions, feedback and commands communicated both ways.

In one embodiment, main field rotating power converter 42 provides overvoltage protection to generator 12. The typical response to an overvoltage condition is to remove the excitation from exciter field winding 24. However, the lag between the time in which excitation is removed from exciter field winding 28 and when excitation is removed from main field winding 44 (which induces the output voltage on main armature winding 32) may result in voltages that are damaging to generator 12 and/or load 16. In embodiments in which main field rotating power converter 42 is utilized to provide protection, but not regulation of generator output voltage, GCU 14 selectively controls the supply of current provided to exciter field winding 28 to regulate the output voltage provided by main armature winding 32. The voltage induced in response to the exciter field winding current is provided without regulation by main field rotating power converter 42 to main field winding 44, allowing current to build up in main field winding 44. In response to an overvoltage condition detected by GCU 14, a command is communicated to rotating portion 26 to cause main field rotating power converter 42 to remove excitation from main field winding 44. In the embodiment shown in FIG. 1, commands provided by GCU 14 are communicated across the air gap between stationary portion 24 and rotating portion 26 by inductively coupled transformer windings 30 and 36. Primary winding 30 is located on stationary portion 24 and secondary winding 36 is located on rotating portion 26. In the embodiment shown in FIG. 1, the command received on secondary winding 36 is communicated directly to driver circuit 46, which in response commands main field rotating power converter 42 to turn Off. In other embodiments, the command may require demodulation before being provided to main field rotating power converter 42. In response to the received command, main field rotating power converter turns Off, thereby preventing the supply of voltage from rotating rectifier 38 to main field winding 44. In addition, when Off, main field rotating power converter 42 may be configured to quickly dissipate current from main field winding 44, thereby quickly reducing the voltage induced on main armature winding 32.

In another embodiment, utilized either independently or in conjunction with the overvoltage protection provided by the architecture, main field rotating power converter 42 can be used to selectively regulate the current supplied to main field winding 44 in order to regulate the output voltage of main armature winding 32. In this embodiment, rather than regulate the output voltage of generator 12 via control of the current supplied to exciter field winding 28, the output voltage of generator 12 is regulated via control the current supplied to main field winding 44. In this embodiment, the current supplied to exciter field winding 28 may not be regulated, but rather kept constant by GCU 14. Feedback regarding the output voltage of generator 12 is communicated by GCU 14 to rotating portion 26 via stationary and rotating communication modules 29 and 35. It should be noted, that while a transformer circuit is utilized in the embodiment shown in FIG. 1 to communicate instructions across the airgap between stationary portion 24 and rotating portion 26, other means of communicating data over the air gap may be employed. Further, as described in more detail below, the type of feedback supplied by GCU 14 to main field rotating power converter 42 may vary depending on the embodiment. For example, in one embodiment GCU 14 monitors the output voltage of generator 12 and provides commands to main field rotating power converter 42 regarding the magnitude of the current to be applied to main field winding 44. These commands may include a duty cycle that determines the On/Off time of main field rotating power converter 42 and thus the magnitude of the current to be supplied to main field winding 44. In other embodiments, GCU 14 monitors the output voltage and communicates the monitored output voltage to main field rotating power converter 42, which based on the received feedback provides regulation of the current supplied to main field winding 44. That is, regulation based on the monitored output voltage is determined on rotating portion 26, rather than on stationary portion 24 by GCU 14 and then communicated to rotating portion 26.

In addition, communication between GCU 14 and rotating portion 26 may be bi-directional, with rotating communication module providing feedback to GCU 14 regarding the monitored current through main field winding 44. In particular, in embodiments in which regulation is performed by GCU 14 (rather than on rotating portion 26), then the current through main field winding 44 is compared to a reference value to determine whether current should be increased or decreased. In embodiments in which regulation is performed on rotating portion 26, then monitored current through main field winding 44 may not be communicated to GCU 14, but rather utilized locally on rotating portion 26 to regulate the current through main field winding 44.

In this way, main field rotating power converter 42, in combination with means for communicating across the airgap between stationary portion 24 and rotating portion 26, allows the output voltage of generator 12 to be regulated via regulation of the main field winding current.

Figure 2:
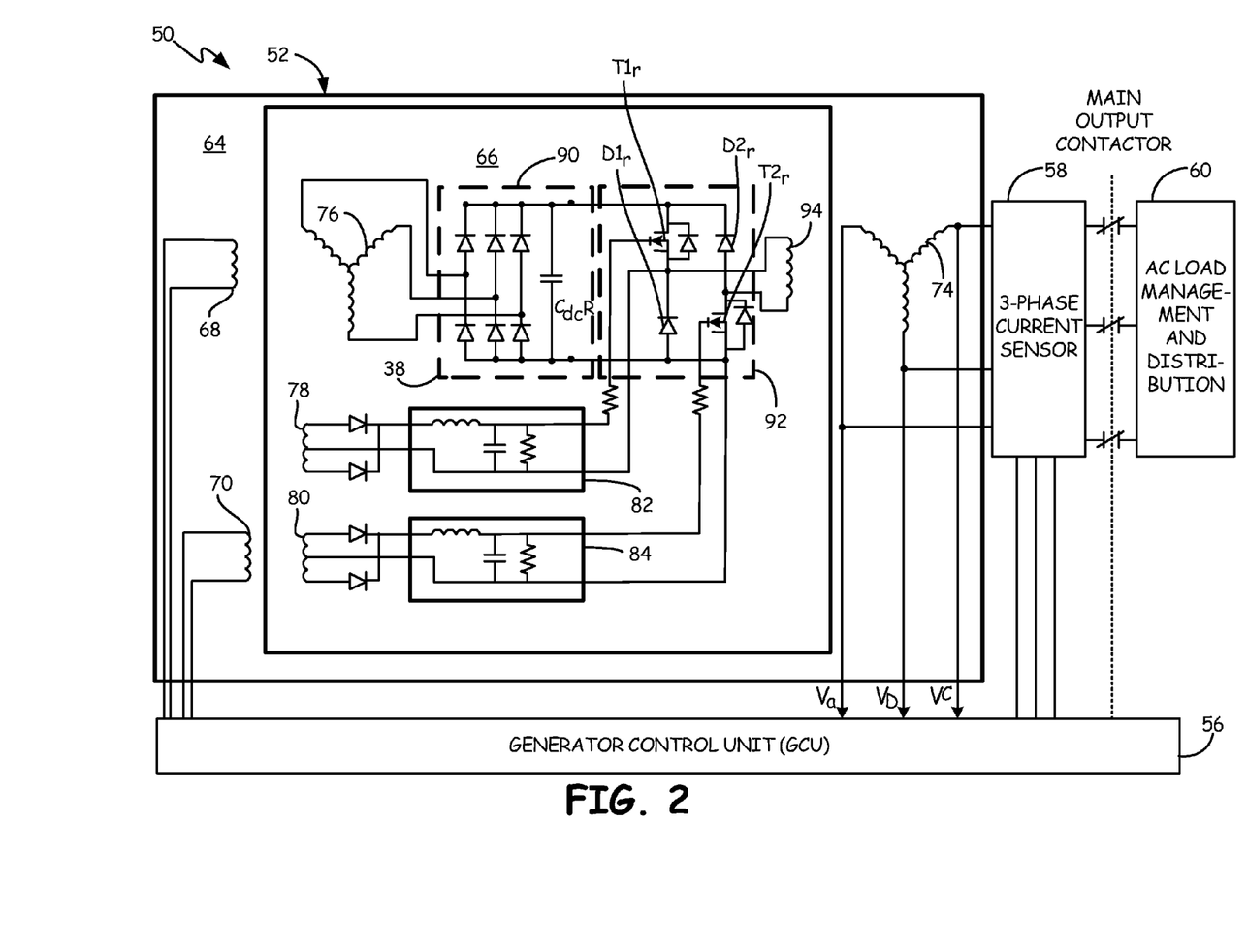
FIG. 2 is a circuit diagram of an electric power generation and distribution system according to an embodiment of the present invention.

FIG. 2 is a circuit diagram of electric power generation and distribution system 50 according to an embodiment of the present invention. The architecture of generator 52 utilizes main field rotating power converter 92 for protection purposes only (i.e., does not provide for regulation of main field winding current). System 50 includes generator 52, generator control unit (GCU) 56, current sensor 58, and AC load and management system 60. Generator 12 includes stationary portion 64 and rotating portion 66. Stationary portion 64 includes exciter field winding 68, primary winding 70, and main armature winding 74. Rotating portion 66 includes exciter armature winding 76, first secondary winding 78, second secondary winding 80, hi-side gate driver 82 and low-side gate driver 84, rotating rectifier 90, main field rotating power converter 92 and main field winding 94. Main field rotating power converter 92 includes hi-side switch T1r, low-side switch T2r, and diodes D1r and D2r.

In the embodiment shown in FIG. 2, when switches T1r and T2r are both turned On then the positive DC voltage provided by rotating rectifier is applied to main field winding 94 and allows current to build up in main field winding 94. In particular, a conductive current path is created from the DC output of rotating rectifier 90 through switch T1r to main field winding 94, and then through switch T2r. When switches T1r and T2r are both Off, then current from rotating rectifier 92 is prevented from being supplied to main field winding 94. In this embodiment, current through main field winding 94 is controlled by regulating the current supplied to exciter field winding 68. Thus, GCU 56 regulates the current through exciter field winding 68 based on the monitored output of generator 52. In response to an overvoltage condition detected by GCU 56, the GCU generates a command to turn Off switches T1r and T2r. The command generated by GCU 56 is communicated via primary winding 70 to first and second secondary windings 78 and 80, both of which are coupled to primary winding 70. In response to the received command, gate drive circuits 82 and 84 turn Off switches T1r and T2r, respectively. When switches T1r and T2r are both Off, current maintained in main field winding 94 is quickly discharged through diodes D1r and D2r and voltage across main field winding 94 becomes negative such that the main field current decreases rapidly to zero. In this way, inductive energy stored in main field winding 94 that would be slowly dissipated otherwise, will be fed back to rotating components where the current is quickly dissipated.

In this way, regulation of the generator output is still controlled via regulation of the current through exciter field winding 68, but the transient response to detected overvoltage conditions is improved by communicated a command to rotating portion 66 to turn Off switches T1r and T2r associated with main field rotating power converter 92. By turning Off switches T1r and T2r, current through main field winding 94 is quickly dissipated through diodes D1r and D2r such that the AC voltage induced on main armature winding 74 is quickly decreased.

Figure 3:
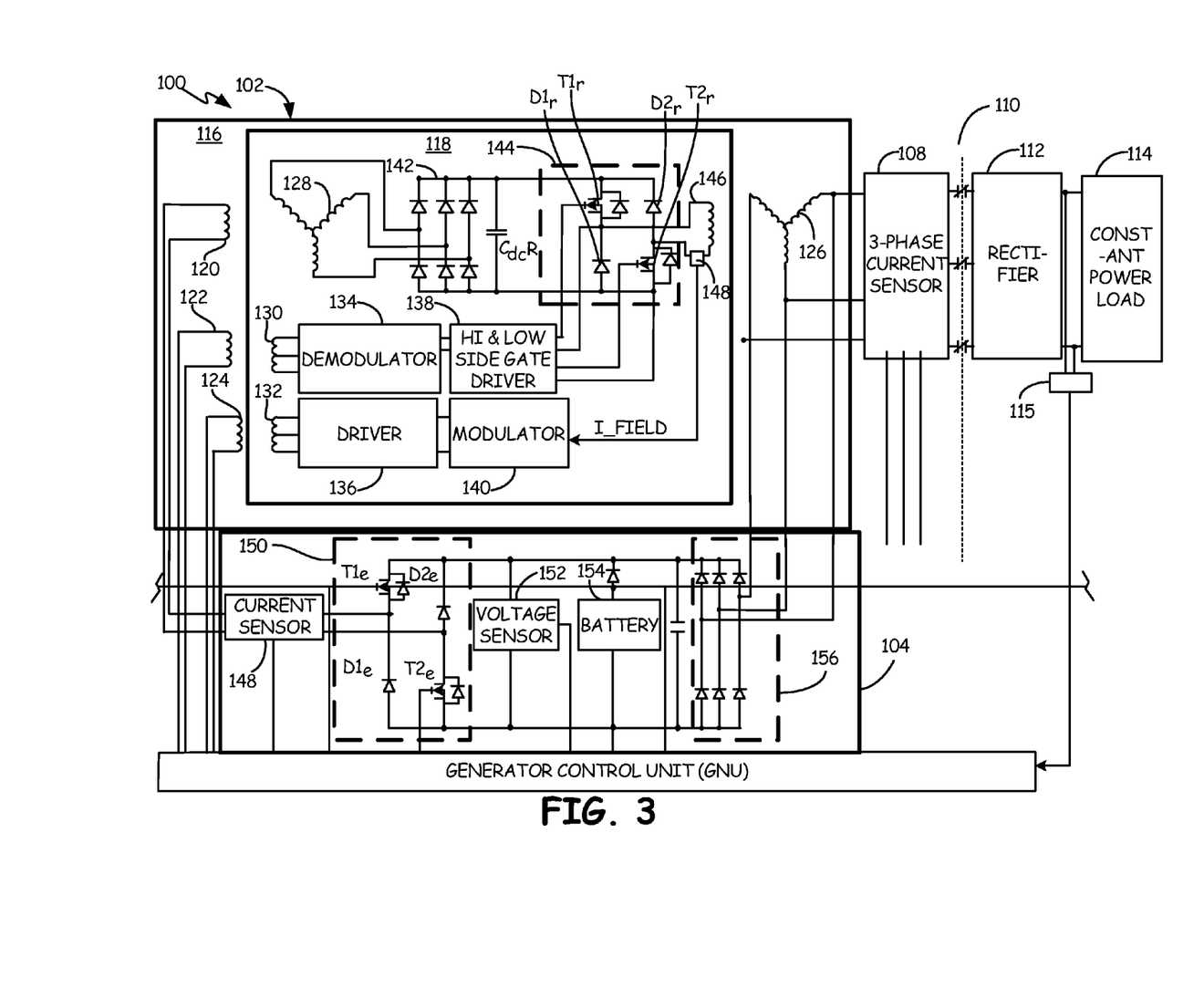
FIG. 3 is a circuit diagram of a high voltage direct current (HVDC) electric power generation and distribution system according to an embodiment of the present invention.

FIG. 3 is a circuit diagram of a high voltage direct current (HVDC) electric power generation and distribution system 100 according to an embodiment of the present invention. The embodiment shown in FIG. 3 allows for both protection and regulation of the main field winding current.

System 100 includes generator 102, exciter converter circuit 104, generator control unit (GCU) 106, current sensor 108, main output contactors 110, rectifier 112, and constant power load 114. Generator 102 includes stationary portion 116 and rotating portion 118. Stationary portion 116 includes exciter field winding 120, first primary winding 122, second primary winding 124, and main armature winding 126. Rotating portion 118 includes exciter armature winding 128, first secondary winding 130, second secondary winding 132, demodulator 134, driver 136, hi-side/low-side gate driver 138, modulator 140, rotating rectifier 142, main field rotating power converter 144 and main field winding 146. Main field rotating power converter 144 includes hi-side switch T1r, low-side switch T2r, and diodes D1r and D2r. Exciter converter circuit 104 includes current sensor 148, exciter power converter 150, voltage sensor 152, battery 154, DC link capacitor Cdc, and exciter rectifier 156.

In the embodiment shown in FIG. 3, additional circuitry has been added to allow the current through main field winding 146 to be regulated, as opposed to simply turned On or Off for protection purposes. As discussed with respect to the embodiment shown in FIG. 2, switches T1r and T2r, as well as diodes D1r and D2r are configured as an asymmetric H-bridge circuit in which voltage supplied by rotating rectifier 142 is provided to main field winding 146 when both switches T1r and T2r are On and prevented from being supplied to main field winding 146 when both switches T1r and T2r are Off. In the embodiment shown in FIG. 3, the current through main field winding 146 is regulated by maintaining switch T2r in an On state and pulse width modulating switch T1r.

To enable regulation of current through main field winding 146, bi-directional communication is required between rotation portion 118 and GCU 106. In particular, the current through main field winding 146 is monitored via current sensor 148. The monitored current I_field is provided to modulator 140, which together with driver circuit 136 converts the monitored current to a format (e.g., pulse stream) that can be communicated across the airgap via second transformer windings 132 and 124 to GCU 106. In addition, GCU 106 monitors the DC output voltage provided by rectifier 112 to load 114. In response to the monitored DC voltage, GCU 106 generates a reference current value I_ref that represents the desired current through main field winding 146. GCU 106 compares the reference current value I_ref to the monitored current I_field to generate command instructions for the switches T1r and T2r. The command instructions are communicated to rotating portion 118 via first primary winding 122 and first secondary winding 132. Demodulator 134 decodes the command instructions and provides the instructions to hi-side/low-wide gate driver 138 to selectively turn switches T1r and T2r On and Off as commanded. During normal operation low-side switch T2r remains in the On state, and only hi-side switch T1r is modulated On and Off. However, if an overvoltage condition is detected then low-side switch T2r may be commanded to the Off position (along with hi-side switch T1r) to prevent voltage from being supplied to main field winding 146 and to quickly drain current from main field winding 146.

In this way, regulation of the generator output voltage is handled, not by regulation of the current through exciter field winding 120, but rather through regulation of the current through main field winding. Because regulation of the output voltage is provided via control of the current through main field winding 146, the current through exciter field winding 120 may be regulated or unregulated.

In the embodiment shown in FIG. 3, exciter converter 104 regulates the exciter field current to provide a constant rotating power supply voltage (i.e., the voltage provided by rotating rectifier 142) that is independent of generator speed. For example, as the speed of the generator increases, the current supplied to exciter field winding 120 is decreased to provide a constant voltage to main field rotating power converter 144. Providing a constant voltage to main field rotating power converter 144 simplifies the control algorithm employed by GCU 106 in regulating the current through main field winding 146.

Exciter converter 104 utilizes the AC output voltage of generator 102 as an input to source the excitation provided to exciter field winding 120. The AC voltage is rectified by exciter rectifier 156, with the DC output of exciter power supply 156 being supplied to exciter converter 150. Voltage sensor 152 monitors the DC voltage supplied to exciter converter 150, and battery 154 supplies voltage to the DC bus if the DC voltage supplied by exciter rectifier 156 is insufficient. For example, when first starting generator 102, no output voltage will be generated at main armature windings 126 until excitation is provided to exciter field winding 120. In the embodiment shown in FIG. 3, battery 154 provides DC voltage during start-up of generator 102.

GCU 106 monitors the current supplied to exciter field winding 120 via current sensor 148 and utilizes exciter converter 150 to regulate the current supplied to exciter field winding 120 to maintain a constant current. In the embodiment shown in FIG. 3, exciter converter includes first and second switches T1e, T2e, and diodes D1e, D2e, connected in an asymmetric H-bridge configuration in which GCU 106 modulates switch T1e to regulate the current supplied to exciter field winding 120. As discussed above, in an asymmetric H-bridge converter, switch T2e remains On while switch T1e is modulated On and Off to regulate the current supplied to exciter field winding 120. Although an asymmetric H-bridge converter is shown, in other embodiments, other well-know converter circuits may be used to regulate the current supplied to exciter field winding 120. In this way, exciter converter circuit 104 regulates the exciter field current to provide a constant DC power supply provided by exciter armature winding 128 that is independent of generator speed.

In another embodiment, the current supplied to exciter field winding 120 is unregulated. In this embodiment, AC voltage supplied by main armature winding 126 is rectified by exciter rectifier 156 and supplied directly to exciter field winding 120. In this embodiment, the resulting voltage provided by exciter armature winding 128 is not regulated and becomes a function of generator speed. However, the current through main field winding 146 may still be regulated via main field rotating power converter 144.

Figure 4:
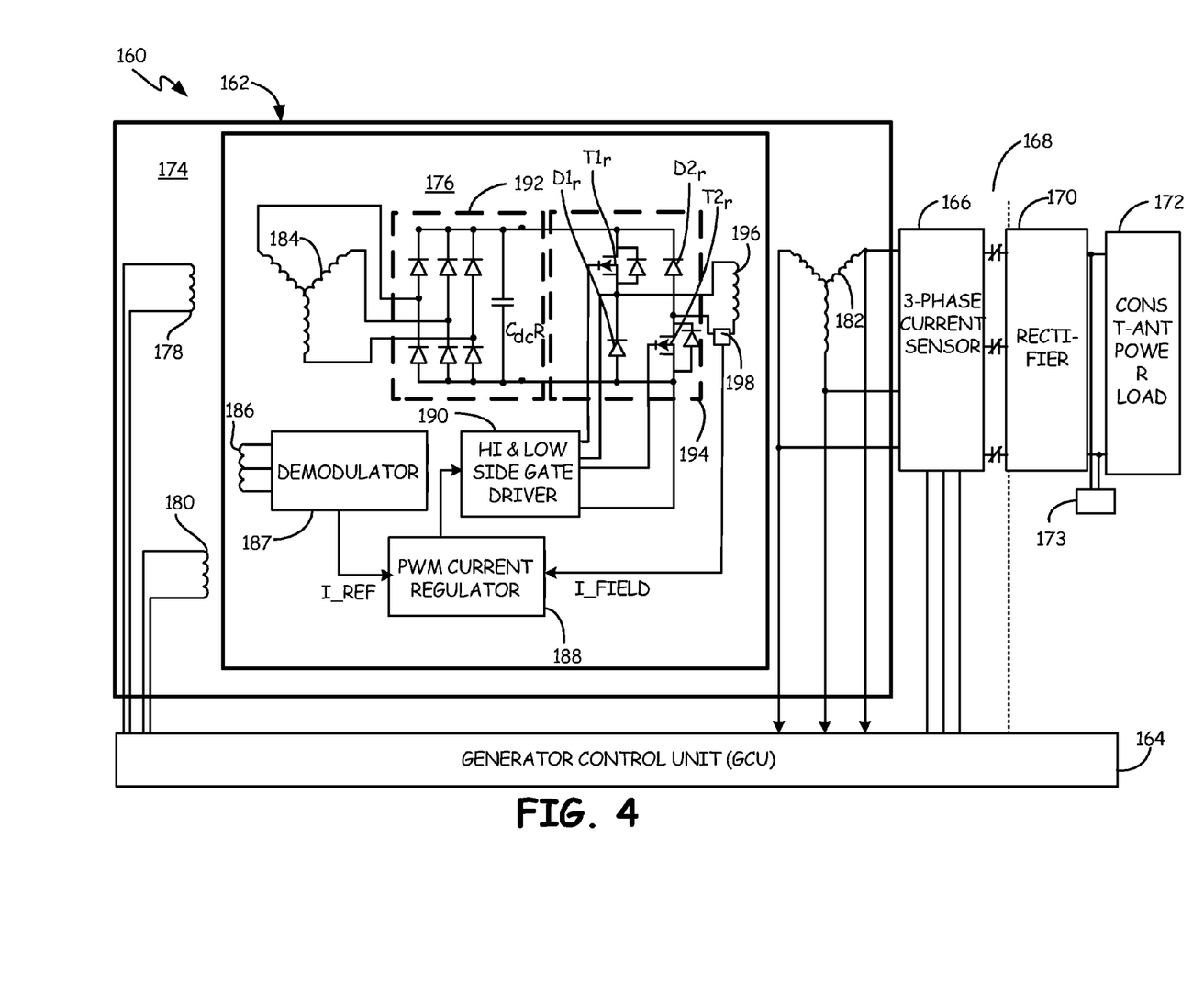
FIG. 4 is a circuit diagram of a high voltage direct current (HVDC) electric power generation and distribution system according to an embodiment of the present invention.

FIG. 4 is a circuit diagram of a high voltage direct current (HVDC) electric power generation and distribution system 162 according to an embodiment of the present invention. System 162 includes generator 162, generator control unit (GCU) 164, current sensor 166, main output contactor 168, rectifier 170, load 172 and voltage sensor 173. Generator 162 includes stationary portion 174 and rotating portion 176. Stationary portion 174 includes exciter field winding 178, primary winding 180, and main armature winding 182. Rotating portion 176 includes exciter armature winding 184, demodulator 186, PWM current regulator 188, hi-side/low-side gate driver 190, rotating rectifier 192, DC link capacitor CdcR, main field rotating power converter 194, main field winding 196, and current sensor 198. Main field rotating power converter includes hi-side switch T1r, low-side switch T2r and diodes D1r, D2r connected in an asymmetric H-bridge configuration.

In contrast with the embodiment shown in FIG. 3, in which the monitored current I_field through the main field winding was communicated to the GCU for regulation calculations, in the embodiment shown in FIG. 4, rotating portion 176 includes PWM current regulator 188 to provide regulation of the main field winding current. A benefit of this approach, is the monitored current does not have to be communicated across the air gap to the GCU, with command instructions subsequently provided by the GCU in response to the monitored current.

In the embodiment shown in FIG. 4, GCU 164 monitors the output voltage of main armature winding 182. Based on the monitored output voltage, GCU 164 generates a main field winding reference current (labeled I_ref) that is communicated to rotating portion 176 via transformer windings 180 and 186. Demodulator 187 demodulates the signal received at secondary winding 186 and provided the received reference current I_ref to PWM current regulator 188, which compares the reference current I_ref to monitored current I_Field. Based on the comparison, PWM current regulator 188 generates command signals provided to hi-side/low-side gate driver 190 to selectively turn hi-side switch T1r and low-side switch T2r On and Off. During normal operation, switch T2r is normally maintained in the On state, while switch T1r is pulse width modulated to generate the desire current through main field winding 196. In addition, during overvoltage conditions, both switches T1r and T2r may be turned Off to provide protection to generator 162 by quickly dissipating the current from main field winding 196.

In the embodiment shown in FIG. 4, GCU 164 supplies a desired current to exciter field winding 178. As discussed above, the current supplied to exciter field winding 178 may be regulated such that the voltage generated in exciter armature winding 184 is independent of generator speed or may be unregulated.

Discussion of Possible Embodiments

The following are non-exclusive descriptions of possible embodiments of the present invention.

A generator comprises a stationary portion and a rotating portion. The stationary portion includes a main armature winding. The rotating portion includes a main field winding and a main field rotating power converter that selectively controls current supplied to the main field winding.

The generator of the preceding paragraph can optionally include, additionally and/or alternatively, any one or more of the following features, configurations and/or additional components.

In any of the foregoing embodiments, the main field rotating power converter may further include a high-side switch connected between a positive DC voltage of a DC bus link and a high side of the main field winding, a low-side switch connected between a negative DC voltage of the DC bus link and a low side of the main field winding, a first diode connected between the high side of the main field winding and the negative DC voltage, and a second diode connected between the low side of the main field winding and the positive DC voltage.

In any of the foregoing embodiments, the high-side switch and the low-side switch may be turned On to allow the DC voltage provided by the DC bus link to be supplied to the main field winding and turned Off to dissipate current in the main field winding via the first and second diode.

In any of the foregoing embodiments, the low-side switch may be turned On and the high-side switch may be modulated On and Off to regulate the current through the main field winding.

In any of the foregoing embodiments, wherein the generator may further include a stationary communication module located on the stationary portion and a rotating communication module located on the rotating portion that is coupled to receive input from the stationary communication module. The rotating communication module communicates instructions received from the stationary communication module to the main field rotating power converter to selectively apply the DC voltage provided by the DC link bus to the main field winding.

In any of the foregoing embodiments, the rotating communication module communicates may receive instructions from the stationary communication module to the main field rotating power converter to regulate the current through the main field winding.

In any of the foregoing embodiments, the stationary communication module may include a first primary winding. The rotating communication module may include a first secondary winding inductively coupled to the first primary winding and a second secondary winding inductively coupled to the first primary winding.

In any of the foregoing embodiments, the generator may further include a high side switch connected between a positive DC voltage of a DC link bus and a high side of the main field winding, and a low-side switch connected between a negative DC voltage of a DC link bus and a low side of the main field winding, a first diode connected between the high side of the main field winding and the negative DC voltage, and a second diode connected between the low side of the main field winding and the positive DC voltage. The generator may further include a high-side gate drive circuit connected to drive the high-side switch On and Off based on input received from the first secondary winding and a low-side gate drive circuit connected to drive the low-side switch On and off based on input received from the second secondary winding, wherein an instruction communicated to the first primary winding is communicated to both the high-side gate drive circuit via the first secondary winding and the low-side gate drive circuit via the second secondary winding.

In any of the foregoing embodiments, the stationary communication module may include a first primary winding and a second primary winding. The rotating communication module may include a first secondary winding and a second secondary winding, wherein the first primary winding is inductively coupled with the first secondary winding to communicate instructions from the stationary portion to the rotating portion and the second primary winding is inductively coupled with the second secondary winding to communicate feedback from the rotating portion to the stationary portion.

In any of the foregoing embodiments, the generator may further include a demodulator coupled to demodulate instructions communicated via the first primary winding and the first secondary winding, a gate drive circuit that controls the state of the main field rotating power converter based on the demodulated instructions, a current sensor that monitors current through the main field winding, a modulator that modulates the sensed current, and a driver circuit coupled to the second secondary winding to communicate the modulated sensed current as feedback from the rotating portion to the stationary portion via second secondary winding and the second primary winding.

In any of the foregoing embodiments, the main field rotating power converter may include a high-side switch connected between a positive DC voltage of a DC link bus and a high side of the main field winding, a low-side switch connected between a negative DC voltage of the DC link bus and a low side of the main field winding, a first diode connected between the high side of the main field winding and the negative DC voltage, and a second diode connected between the low side of the main field winding and the positive DC voltage, wherein current through the main field winding is regulated by maintaining the low-side switch in an On state and pulse width modulating the high-side switch based on demodulated instructions received via the first primary winding and the first secondary winding.

In any of the foregoing embodiments, the stationary communication module may include a primary winding and the rotating communication module includes a secondary winding inductively coupled to the primary winding.

In any of the foregoing embodiments, the generator may further include a demodulator coupled to the secondary winding to demodulate instructions received from the primary winding, including a reference current representing a desired current to be provided through the main field winding, and a pulse-width modulator (PWM) current regulator connected to monitor current through the main field winding and compare the monitored current to the reference current to calculated PMW control signals provided to the main field rotating power converter to selectively apply the DC voltage to the main field winding.

A generator system may include a generator, a stationary communication module, a rotating communication module, a generator control unit, and a main field rotating power converter. The generator may include a stationary portion and a rotating portion, wherein the generator includes a main field winding on the rotating portion and an main armature winding on the stationary portion. The rotating communication module is located on the rotating portion of the generator and may be configured to receive communications from the stationary communication module. The generator control unit is connected to monitor the output voltage generated by the main armature winding of the generator and to provide instructions via the stationary communication module to the rotating portion of the generator. The main field rotating power converter located on the rotating portion of the generator that in response to instructions received from the GCU selectively controls excitation provided to the main field winding.

The generator system of the preceding paragraph can optionally include, additionally and/or alternatively, any one or more of the following features, configurations and/or additional components.

In any of the foregoing embodiments, in response to an overvoltage condition detected by the generator control unit, the generator control unit may provide an instruction to the main field rotating power converter to remove excitation from the main field winding.

In any of the foregoing embodiments, in response to monitored output voltage of the generator, the generator control unit may provide instructions to the rotating portion of the generator to selectively turn main field rotating power converter On and Off to regulate current through the main field winding.

In any of the foregoing embodiments, in response to monitored output voltage of the generator, the generator control unit provides a current reference value to the rotating portion of the generator, wherein the rotating portion includes a pulse-width modulation current regulator that selectively turns the main field rotating power converter On and Off to regulate the current through the main field winding.

In any of the foregoing embodiments, the main field rotating power converter may further include a high-side switch connected between a positive DC voltage of a DC bus link and a high side of the main field winding, a low-side switch connected between a negative DC voltage of the DC bus link and a low side of the main field winding, a first diode connected between the high side of the main field winding and the negative DC voltage, and a second diode connected between the low side of the main field winding and the positive DC voltage.

In any of the foregoing embodiments, the high-side switch and the low-side switch may be turned On to allow the DC voltage provided by the DC bus link to be supplied to the main field winding and turned Off to dissipate current in the main field winding via the first and second diode.

In any of the foregoing embodiments, the low-side switch may be turned On and the high-side switch may be modulated On and Off to regulate the current through the main field winding.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A generator comprising:
a stationary portion that includes a main armature winding;
a rotating portion that includes a main field winding and a main field rotating power converter that selectively controls current supplied to the main field winding;
a stationary communication module located on the stationary portion;
a rotating communication module located on the rotating portion that is coupled to receive input from the stationary communication module, wherein the rotating communication module communicates instructions received from the stationary communication module to the main field rotating power converter to selectively apply the DC voltage provided by the DC link bus to the main field winding; and
wherein the stationary communication module includes a first primary winding and the rotating communication module includes a first secondary winding inductively coupled to the first primary winding and a second secondary winding inductively coupled to the first primary winding.

2. The generator of claim 1, wherein the main field rotating power converter includes:
a high-side switch connected between a positive DC voltage of a DC bus link and a high side of the main field winding;
a low-side switch connected between a negative DC voltage of the DC bus link and a low side of the main field winding;
a first diode connected between the high side of the main field winding and the negative DC voltage; and
a second diode connected between the low side of the main field winding and the positive DC voltage.

3. The generator of claim 2, wherein the high-side switch and the low-side switch are turned On to allow the DC voltage provided by the DC bus link to be supplied to the main field winding and turned Off to dissipate current in the main field winding via the first and second diode.

4. The generator of claim 2, wherein the low-side switch is turned On and the high-side switch is modulated On and Off to regulate the current through the main field winding.

5. The generator of claim 1, wherein the rotating communication module communicates instructions received from the stationary communication module to the main field rotating power converter to regulate the current through the main field winding.

6. The generator of claim 1, further including:
a high-side switch connected between a positive DC voltage of a DC link bus and a high side of the main field winding;
a low-side switch connected between a negative DC voltage of a DC link bus and a low side of the main field winding;
a first diode connected between the high side of the main field winding and the negative DC voltage; and
a second diode connected between the low side of the main field winding and the positive DC voltage;
a high-side gate drive circuit connected to drive the high-side switch On and Off based on input received from the first secondary winding; and
a low-side gate drive circuit connected to drive the low-side switch On and off based on input received from the second secondary winding, wherein an instruction communicated to the first primary winding is communicated to both the high-side gate drive circuit via the first secondary winding and the low-side gate drive circuit via the second secondary winding.

7. A generator system comprising:
a generator having a stationary portion and a rotating portion, wherein the generator includes a main field winding on the rotating portion and an main armature winding on the stationary portion;
a stationary communication module located on the stationary portion of the generator;
a rotating communication module located on the rotating portion of the generator and configured to receive communications from the stationary communication module;
a generator control unit (GCU) connected to monitor the output voltage generated by the main armature winding of the generator and to provide instructions via the stationary communication module to the rotating portion of the generator;
a main field rotating power converter located on the rotating portion of the generator that in response to instructions received from the GCU selectively controls excitation provided to the main field winding; and
wherein the stationary communication module includes a first primary winding and a second primary winding and the rotating communication module includes a first secondary winding and a second secondary winding, wherein the first primary winding is inductively coupled with the first secondary winding to communicate instructions from the stationary portion to the rotating portion and the second primary winding is inductively coupled with the second secondary winding to communicate feedback from the rotating portion to the stationary portion.

8. The generator system of claim 7, wherein in response to an overvoltage condition detected by the generator control unit, the generator control unit provides an instruction to the main field rotating power converter to remove excitation from the main field winding.

9. The generator system of claim 7, wherein in response to monitored output voltage of the generator, the generator control unit provides instructions to the rotating portion of the generator to selectively turn main field rotating power converter On and Off to regulate current through the main field winding.

10. The generator system of claim 7, wherein in response to monitored output voltage of the generator, the generator control unit provides a current reference value to the rotating portion of the generator, wherein the rotating portion includes a pulse-width modulation current regulator that selectively turns the main field rotating power converter On and Off to regulate the current through the main field winding.

11. The generator system of claim 7, wherein the main field rotating power converter includes:
   a high-side switch connected between a positive DC voltage of a DC bus link and a high side of the main field winding;
   a low-side switch connected between a negative DC voltage of the DC bus link and a low side of the main field winding;
   a first diode connected between the high side of the main field winding and the negative DC voltage; and
   a second diode connected between the low side of the main field winding and the positive DC voltage.

12. The generator of claim 11, wherein the high-side switch and the low-side switch are turned On to allow the DC voltage provided by the DC bus link to be supplied to the main field winding and turned Off to dissipate current in the main field winding via the first and second diode.

13. The generator of claim 11, wherein the low-side switch is turned On and the high-side switch is modulated On and Off to regulate the current through the main field winding.

14. The generator system of claim 7, wherein the generator further includes:
   a demodulator coupled to demodulate instructions communicated via the first primary winding and the first secondary winding;
   a gate drive circuit that controls the state of the main field rotating power converter based on the demodulated instructions;
   a current sensor that monitors current through the main field winding;
   a modulator that modulates the sensed current; and
   a driver circuit coupled to the second secondary winding to communicate the modulated sensed current as feedback from the rotating portion to the stationary portion via second secondary winding and the second primary winding.

15. A generator comprising:
   a stationary portion that includes a main armature winding;
   a rotating portion that includes a main field winding and a main field rotating power converter that selectively controls current supplied to the main field winding;
   a stationary communication module located on the stationary portion;
   a rotating communication module located on the rotating portion that is coupled to receive input from the stationary communication module, wherein the rotating communication module communicates instructions received from the stationary communication module to the main field rotating power converter to selectively apply the DC voltage provided by the DC link bus to the main field winding; and
   wherein the stationary communication module includes a primary winding and the rotating communication module includes a secondary winding inductively coupled to the primary winding.

16. The generator of claim 15, further including:
   a demodulator coupled to the secondary winding to demodulate instructions received from the primary winding, including a reference current representing a desired current to be provided through the main field winding; and
   a pulse-width modulator (PWM) current regulator connected to monitor current through the main field winding and compare the monitored current to the reference current to calculated PMW control signals provided to the main field rotating power converter to selectively apply the DC voltage to the main field winding.

* * * * *